United States Patent
Nishimoto et al.

(10) Patent No.: US 11,305,519 B2
(45) Date of Patent: Apr. 19, 2022

(54) ANTISTATIC LAMINATED FOAM SHEET AND PROCESS FOR PRODUCING SAME

(71) Applicant: JSP CORPORATION, Tokyo (JP)

(72) Inventors: Takashi Nishimoto, Utsunomiya (JP); Ryohei Takeuchi, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 117 days.

(21) Appl. No.: 16/887,465

(22) Filed: May 29, 2020

(65) Prior Publication Data
US 2020/0398540 A1    Dec. 24, 2020

(30) Foreign Application Priority Data
Jun. 24, 2019    (JP) .............................. JP2019-116276

(51) Int. Cl.
*B32B 27/06* (2006.01)
*B32B 27/32* (2006.01)
*C08J 9/12* (2006.01)

(52) U.S. Cl.
CPC ............ *B32B 27/065* (2013.01); *B32B 27/32* (2013.01); *C08J 9/12* (2013.01); *B32B 2266/025* (2013.01); *B32B 2307/21* (2013.01); *B32B 2323/04* (2013.01); *C08J 2201/03* (2013.01); *C08J 2323/06* (2013.01)

(58) Field of Classification Search
CPC ....... B32B 27/065; B32B 27/32; B32B 27/18; B32B 2266/025; B32B 2307/21; B32B 2323/04; C08J 9/12; C08J 2323/06
See application file for complete search history.

(56) References Cited

U.S. PATENT DOCUMENTS 10,465,057 B2 * 11/2019 Aoki ....................... B32B 27/18
2016/0311202 A1    10/2016 Aoki et al.

FOREIGN PATENT DOCUMENTS

| EP | 3115202 A1 | 11/2017 |
| JP | 3215734 B2 | 10/2001 |
| JP | 2010042556 A | 2/2010 |
| JP | 2016204227 A | 12/2016 |
| WO | WO-2016152910 A1 * | 9/2016 ............. B29C 44/24 |

OTHER PUBLICATIONS

Extended European Search Report in corresponding European Application No. 20000211.1, dated Nov. 17, 2020.

* cited by examiner

*Primary Examiner* — Hai Vo
(74) *Attorney, Agent, or Firm* — Bacon & Thomas, PLLC (57) ABSTRACT

A laminated foam sheet obtained by a coextrusion lamination method and having a polyethylene foam layer, and an antistatic layer laminated on at least one side of the foam layer. The antistatic layer contains a polyethylene resin, an ionomer resin and a polyalkylene glycol and has such specific morphology that the polyethylene resin forms a continuous phase and the ionomer resin forms small dispersed phases dispersed in the continuous phase.

11 Claims, 3 Drawing Sheets

ANTISTATIC LAMINATED FOAM SHEET AND PROCESS FOR PRODUCING SAME

BACKGROUND OF THE INVENTION

The present invention relates to an antistatic laminated foam sheet and to a process for producing same.

A polyethylene-based resin foam sheet, which is soft and flexible and has good cushioning property, is now widely used as, for example, an interleaf sheet for being inserted between glass plates, such as liquid crystal panels, and a cushioning or packaging material for electronic devices. Because such a foam sheet is apt to generate static electricity and cause dust deposition problems, antistatic property must be imparted thereto. To cope with the above problem, Japanese unexamined patent publication No. JP-A-2016-204227 proposes a method for producing a laminated foam sheet, in which a melt for forming a foam layer and a melt for forming a resin layer containing a polymeric antistatic agent are coextruded to obtain the laminated foam sheet having a foam layer overlaid with an antistatic resin layer.

For being used as an interleaf sheet for glasses and the like applications, there is a strong demand for a laminated foam sheet which shows an improved property to prevent an article to be packaged or wrapped with the sheet from being stained with low molecular matters contained therein. Thus, as the polymeric antistatic agent, the use of an ionomer resin which is relatively low in low molecular weight matter content is proposed.

However, it has been difficult to obtain a laminated foam sheet having the desired antistatic properties in a stable manner by laminating an ionomer resin-containing polyethylene resin layer on a polyethylene resin foam layer by a coextrusion lamination method.

The present invention is aimed at provision of a novel laminated foam sheet which shows excellent antistatic property and yet has excellent property to prevent an article to be packaged or wrapped with the sheet from being stained with low molecular matters contained in the sheet. The present invention is also aimed at provision of a process for producing such a laminated foam sheet in a stable manner.

SUMMARY OF THE INVENTION

In accordance with one aspect of the present invention there are provided the following laminated foam sheets:
[1] An extruded laminated foam sheet comprising a polyethylene-based resin foam layer, and an antistatic layer laminated on at least one side of the foam layer,
said antistatic layer having a basis weight of 1 to 20 g/m$^2$ and containing a polyethylene-based resin (PE-2), an ionomer resin having an antistatic property and a polyalkylene glycol,
wherein the ionomer resin is contained in the antistatic layer in an amount of 5 to 50% by weight based on the total weight of the polyethylene-based resin (PE-2) and the ionomer resin,
wherein the polyethylene-based resin (PE-2) forms a continuous phase, and the ionomer resin forms dispersed phases dispersed in the continuous phase, and
wherein, on a vertical cross-section of the antistatic layer, which is taken along the extrusion direction of the laminated foam sheet, a number-based median value $S_{50}$ of cross-sectional areas of the dispersed phases is $1 \times 10^2$ to $5 \times 10^5$ nm$^2$.
[2] The extruded laminated foam sheet according to above [1], wherein, on the vertical cross-section of the antistatic layer, an aspect ratio $LM_{50}/LT_{50}$ of a number-based median value $LM_{50}$ of diameters in the extrusion direction of the dispersed phases to a number-based median value $LT_{50}$ of diameters in the thickness direction of the dispersed phases is 2 or more.
[3] The extruded laminated foam sheet according to above [1] or [2], wherein the polyalkylene glycol is present in the antistatic layer in an amount of 0.3 to 6% based on the weight of the antistatic layer.
[4] The extruded laminated foam sheet according to any one of above [1] to [3], wherein a weight ratio of the polyalkylene glycol to the ionomer resin is 0.03 to 0.6.
[5] The extruded laminated foam sheet according to any one of above [1] to [4], wherein a difference (Tmp−Tmi) between a melting point Tmp of the polyethylene-based resin (PE-2) and a melting point Tmi of the ionomer resin is 5 to 30° C.
[6] The extruded laminated foam sheet according to any one of above [1] to [5], wherein the antistatic layer has a surface resistivity of $1 \times 10^{13} \Omega$ or less.
[7] The extruded laminated foam sheet according to any one of above [1] to [6], and having a thickness of 0.05 to 2 mm.
[8] The extruded laminated foam sheet according to any one of above [1] to [7], and having an apparent density of 15 to 200 kg/m$^3$.

In another aspect, the present invention provides the following laminated foam sheets:
[9] A process for producing a laminated foam sheet having a polyethylene-based resin foam layer and a polyethylene-based resin antistatic layer laminated on at least one side of the foam layer, comprising the steps of:
providing a first melt containing a polyethylene-based resin (PE-1) and a physical blowing agent,
providing a second melt containing a polyethylene-based resin (PE-2), an ionomer resin having an antistatic property, a polyalkylene glycol and a volatile plasticizer, and
coextruding the first and second melts to form the laminated foam sheet in which the polyethylene-based resin foam layer and the polyethylene-based resin antistatic layer are formed from the first and second melts, respectively,
wherein the ionomer resin is present in the second melt in an amount of 5 to 50% by weight based on the total weight of the polyethylene-based resin (PE-2) and the ionomer resin, and wherein a weight ratio of the polyalkylene glycol to the ionomer resin is 0.03 to 0.6.
[10] The process according to above [9], wherein the volatile plasticizer is present in the second melt in an amount of 1 to 60 parts by weight per 100 parts by weight of the total weight of the polyethylene-based resin (PE-2) and the ionomer resin and wherein a weight ratio of the volatile plasticizer to polyalkylene glycol is 5 to 100.
[11] The process according to above [9] or [10], wherein the volatile plasticizer is at least one selected from the group consisting of saturated hydrocarbons having 3 to 5 carbon atoms, dialkyl ethers in which each alkyl has 1 to 3 carbon atoms, and alcohols.
[12] The process according to above [9] or [10], wherein the volatile plasticizer is n-butane, isobutane or a mixture thereof.

BRIEF DESCRIPTION OF THE DRAWINGS

Other objects, features and advantages of the present invention will become apparent from the detailed description of the preferred embodiments of the invention which follows, when considered in light of the accompanying drawings in which.

DETAILED DESCRIPTION OF THE INVENTION

The laminated foam sheet according to the present invention has a foam layer and an antistatic layer laminated on at least one side of the foam layer and is produced by a coextrusion lamination method. The laminated foam sheet preferably has two antistatic layers provided on both sides of the foam layer from the standpoint of effective prevention of deposition of dusts or dirts, especially when used as an interleaf sheet that is to be interposed between articles such as glass plates. The essential components of the foam and antistatic layers of the laminated foam sheet according to the present invention will be described below.

The foam layer is formed of a polyethylene-based resin (PE-1). The polyethylene-based resin (PE-1) may be an ethylenic polymer such as low-density polyethylene, linear low-density polyethylene and high-density polyethylene; an ethylenic copolymer having an ethylene monomer unit content of at least 50 mole % such as an ethylene-vinyl acetate copolymer and ethylene-methyl methacrylate copolymer; or a mixture of two or more ethylenic polymers and/or ethylenic copolymers.

It is preferred that the polyethylene-based resin (PE-1) contains low-density polyethylene in an amount of 50% by weight or more, more preferably 60% by weight or more, still more preferably 70% by weight or more, yet still more preferably 80% by weight or more, particularly preferably 90% by weight or more, for reasons of excellent extrusion foaming property and excellent impact resistance of the obtained foam layer. Most preferably, the polyethylene-based resin (PE-1) consists only of low-density polyethylene. The low-density polyethylene is an ethylenic polymer having a density of 910 kg/m$^3$ or higher and lower than 930 kg/m$^3$.

The polyethylene-based resin (PE-1) preferably has a density of 910 kg/m$^3$ or higher and lower than 942 kg/m$^3$, more preferably 910 kg/m$^3$ or higher and 935 kg/m$^3$ or lower, particularly preferably 910 kg/m$^3$ or higher and lower than 930 kg/m$^3$.

If desired, the foam layer may contain one or more additional polymers such as thermoplastic elastomers and thermoplastic resins other than the ethylenic polymer and copolymer. Such an additional polymer is preferably contained in an amount of 20 parts by weight or less, more preferably 10 parts by weight or less, based on 100 parts by weight of the polyethylene-based resin (PE-1).

The polyethylene-based resin (PE-1) may be added with one or more additives such as a cell controlling agent, a nucleating agent, an antioxidant, a heat stabilizer, a weathering stabilizer, a UV absorbing agent, a flame retardant, an antibacterial agent, a shrinkage preventing agent and an inorganic filler.

The antistatic layer laminated on at least one side of the foam layer contains, as its essential components, a polyethylene-based resin (PE-2), an ionomer resin having an antistatic property and a polyalkylene glycol, details of which will be described below.

The polyethylene-based resin (PE-2) of the antistatic layer may be selected from the ethylenic polymers and copolymers described above in connection with the polyethylene-based resin (PE-1). For reasons of obtaining laminated foam sheets having excellent antistatic property in a stable manner, it is preferred that the polyethylene-based resin (PE-2) contains low-density polyethylene in an amount of 50% by weight or more, more preferably 60% by weight or more, still more preferably 80% by weight or more, particularly preferably 90% by weight or more from the standpoint of softness and flexibility. It is also preferred that the same kind of an ethylenic polymer, particularly low-density polyethylene, is used for the polyethylene-based resins (PE-1) and (PE-2) for reasons of tight bonding between the foam layer and the antistatic layer.

The polyethylene-based resin (PE-2) is preferably contained in the antistatic layer in an amount of 50% by weight or more, more preferably 60% by weight or more, particularly preferably 70% by weight or more, based on the weight of the antistatic layer. The upper limit of the content of the polyethylene-based resin (PE-2) is about 95% by weight.

The ionomer resin having an antistatic property (hereinafter simply referred to as "ionomer resin") contained in the antistatic layer is used as a polymeric antistatic agent. The ionomer resin is a polymer containing interchain ionic bonding and may be obtained by copolymerizing ethylene and an unsaturated carboxylic acid, followed by neutralization by metal cations. Examples of the unsaturated carboxylic acid include acrylic acid, methacrylic acid and maleic acid. Examples of the metal cation include lithium, sodium, potassium and calcium. A potassium-containing ionomer resin is particularly preferred. Specific examples of the ionomer resin include those available from duPont-Mitsui Polychemicals Co., Ltd. under the trade names of "ENTIRA SD100" and "ENTIRA MK400".

The ionomer resin has a low surface resistivity and is able to impart desired antistatic properties to the laminated foam sheet. Further, since the ionomer resin is low in content of low molecular weight matters, an article which is brought into direct contact with the laminated foam sheet of the present invention is prevented from causing surface staining attributed to transference of low molecular matters from the laminated foam sheet.

The ionomer resin preferably has a surface resistivity of less than $1 \times 10^{12} \Omega$, for reasons that a laminated foam sheet having desired antistatic properties may be obtained in a stable manner. From this standpoint, the surface resistivity of the ionomer resin is more preferably $1 \times 10^{11} \Omega$ or less, still more preferably $1 \times 10^{10} \Omega$, or less, particularly preferably $1 \times 10^{9} \Omega$ or less. The surface resistivity is as measured according to JIS K6271(2001).

The ionomer resin is preferably contained in the antistatic layer in an amount of 5 to 50% by weight based on the total weight of the polyethylene-based resin (PE-2) and the ionomer resin. When the amount of the ionomer resin is 5% by weight or higher, the laminated foam sheet shows desired antistatic properties. When the amount of the ionomer resin is 50% by weight or less, on the other hand, problems of transference of low molecular weight matters and of increase of the production costs may be avoided and, additionally, flat laminated foam sheets is easily obtainable. From this stand point, the lower limit of the amount of the ionomer resin is more preferably 6% by weight, still more preferably 8% by weight, particularly preferably 10% by weight, while the upper limit thereof is more preferably 45% by weight, still more preferably 40% by weight, yet still more preferably 30% by weight, particularly preferably 20% by weight.

The antistatic layer should contain a polyalkylene glycol. The polyalkylene glycol plays an important role in imparting excellent antistatic properties to the laminated foam sheet of the present invention. Namely, the polyalkylene glycol makes it possible to easily prepare the antistatic layer having a morphology in which the ionomer resin forms dispersed phases (islands) dispersed in a continuous phase (sea) of the polyethylene-based resin (PE-2) and to impart improved antistatic properties to the laminated foam sheet. Additionally, since the polyalkylene glycol-containing antistatic layer can reduce moisture dependence of the antistatic properties thereof, the laminated foam sheet shows the desired antistatic properties even when subjected to a low humidity condition.

The polyalkylene glycol preferably has an HLB value of 8 or more, more preferably 10 or more, still more preferably 15 or more from the standpoint of stable dispersion of the ionomer resin in the polyethylene-based resin (PE-2). Specific examples of such polyalkylene glycol include polyethylene glycol, polyoxyethylenepolyoxypropylene glycol and mixtures thereof. Of these, polyethylene glycol (HLB value is 20) is particularly preferred because of its capability of improving antistatic properties and reducing moisture dependence of the antistatic properties.

As used herein the HLB value is determined by Griffin's method using the following formula:

$$HLB = 20 \times Mh/Mw$$

where Mh is the molecular weight of the hydrophilic portion of the hydrophilic compound and Mw is the molecular weight of the whole hydrophilic compound.

More specifically, the HLB value of the polyalkylene glycol is determined as follows. When the polyalkylene glycol is a copolymer of polyethylene glycol and other polyalkylene glycol than polyethylene glycol, the polyethylene portion is regarded as a hydrophilic portion. The other polyalkylene glycol portion is examined for its hydrophilicity and lipophilicity to determine whether it is hydrophilic portion or hydrophobic portion. The HLB value is then calculated by the above Griffin's method. When the polyalkylene glycol is polyethylene glycol, the HLB value thereof is 20 because Mh equals Mw.

The polyethylene glycol used in the antistatic layer preferably has a number average molecular weight of 100 to 10,000, more preferably 120 to 5,000, still more preferably 140 to 3,000, yet still more preferably 150 to 1,000, particularly preferably 200 to 600 for reasons that the laminated foam sheet has excellent antistatic properties. The number average molecular weight of the polyethylene glycol may be calculated by any known method from its hydroxyl value. If desired, two or more kinds of polyethylene glycols having different number average molecular weights may be used in combination. In this case, the number average molecular weight of the mixed polyethylene glycols is a weighed average value that is calculated from the number average molecular weights and mass fractions of the respective polyethylene glycols constituting the mixed polyethylene glycol according to the following formula:

$$NM = (NM1 \times W1 + \ldots + NMn \times Wn)/W$$

wherein NM represents the number average molecular weight of the mixed polyethylene glycol, NM1 to NMn and W1 to Wn represent the number average molecular weights and mass fractions, respectively, of n kinds of the polyethylene glycols constituting the mixed polyethylene glycol and W is a total mass $(W1 + \ldots + Wn)$ of the n kinds of the polyethylene glycols constituting the mixed polyethylene glycol.

It is preferred that the polyalkylene glycol is contained in the antistatic layer in an amount of 0.3 to 6% based on the weight of the antistatic layer for reasons of excellent antistatic properties of the laminated foam sheet. When the polyalkylene glycol is polyethylene glycol, the amount thereof in the antistatic layer is preferably 0.5 to 5%, still more preferably 0.8 to 4%, particularly preferably 1 to 4%, based on the weight of the antistatic layer for the same reasons as above.

It is also preferred that a weight ratio of the polyalkylene glycol to the ionomer resin is 0.03 to 0.6, more preferably 0.03 to 0.5, still more preferably 0.04 to 0.4, particularly preferably 0.05 to 0.3, for reasons that the ionomer resin is efficiently dispersed in the matrix of the polyethylene-based resin (PE-2).

The antistatic layer may contain an additional polymer such as a thermoplastic elastomer and a thermoplastic resin other than the ethylenic polymer. However, it is preferred that the antistatic layer is substantially free of a polystyrene-based resin such as general-use polystyrene, rubber-modified polystyrene (impact resistant polystyrene) and copolymers of styrene and a copolymerizable vinyl monomer having a styrenic monomer unit content of 50% or more, for reasons of improved cushioning property and recyclability of the laminated foam sheet. It is desired that the content of such a styrene-based resin in the antistatic layer is less than 5% by weight or less, preferably 3% by weight or less, particularly preferably zero.

The antistatic layer preferably contains a filler such as inorganic powder for reasons that it is easy to obtain a laminated foam sheet which has good antistatic properties and which is flat and not waved even when the ionomer resin content thereof is increased. Specific examples of the filler include talc, zeolite, silica and calcium carbonate. Of these, talc is particularly preferred. To obtain the above effect, the inorganic filler is preferably used in an amount of 1 to 20% by weight, more preferably 2 to 15% by weight, based on the total weight of the polyethylene-based resin (PE-2) and the ionomer resin. The weight ratio of the inorganic filler to the alkylene glycol is preferably 0.5 to 60, more preferably 0.8 to 30, particularly preferably 1 to 15 for the same reasons as above.

It is important that the antistatic layer has such a morphology that the polyethylene-based resin (PE-2) forms a continuous phase (sea) and the ionomer resin forms dispersed phases (islands) dispersed in the continuous phase. Because the polyethylene-based resin (PE-2) forms a continuous phase, the antistatic layer shows excellent flexibility and cushioning properties. Further, because the ionomer resin forms dispersed phases which are small in size, the laminated foam sheet of the present invention exhibits excellent antistatic properties.

The size of the ionomer resin dispersed phases is represented by a number-based median value $S_{50}$ of cross-sectional areas of the dispersed phases. Thus, it is important that, on a vertical cross-section of the antistatic layer, which is taken along the extrusion direction of the laminated foam sheet, a number-based median value $S_{50}$ of cross-sectional areas of the dispersed phases should be $1 \times 10^2$ to $5 \times 10^5$ nm$^2$.

The number-based median cross-sectional area $S_{50}$ is a cross-sectional area of that dispersed phase which is located in the middle of the total number of dispersed phases arranged in the order of their sizes (at 50% of the cumulative number). The cross-sectional areas of the dispersed phases are measured on a vertical (thickness direction) cross-section of the antistatic layer, which is taken along the extrusion direction (machine direction or direction normal to the transverse and vertical directions) of the laminated foam sheet. From the number-based median cross-sectional area $S_{50}$, it is possible to evaluate the degree of contribution of the ionomer resin dispersed phases to the antistatic performance of the antistatic layer.

More specifically, when $S_{50}$ is in the range of $1 \times 10^2$ to $5 \times 10^5$ nm$^2$, small size ionomer dispersed phases are dispersed in the matrix of the polyethylene-based resin (PE-2) in a significant proportion. Such a small $S_{50}$ has never been conventionally attained. Too small a $S_{50}$ value below the above range cannot develop desired antistatic properties. When $S_{50}$ exceeds the above range, on the other hand, the dispersion phases cannot be appropriately dispersed in the matrix resin and the desired antistatic property cannot be attained. From the above point of view, the lower limit is preferably $5 \times 10^2$ nm$^2$, more preferably $1 \times 10^3$ nm$^2$, and the upper limit is preferably $1 \times 10^5$ nm$^2$, more preferably $5 \times 10^4$ nm$^2$.

Although the ionomer resin, which has been hitherto difficult to stably give an antistatic layer having excellent antistatic properties, is used as a polymeric antistatic agent, the laminated foam sheet of the present invention has excellent antistatic properties. It is believed that the excellent antistatic properties can be attained because the ionomer resin dispersed phases are uniformly and finely dispersed in the polyethylene-based resin (PE-2) to form a conductive network structure showing improved antistatic properties.

It is preferred that the ionomer resin dispersed phases have a specific aspect ratio in addition to the above specific $S_{50}$. Namely, on the above-mentioned vertical cross-section of the antistatic layer, an aspect ratio $LM_{50}/LT_{50}$ of a number-based median value $LM_{50}$ of diameters in the extrusion direction of the dispersed phases to a number-based median value $LT_{50}$ of diameters in the thickness direction of the dispersed phases is preferably 2 or more. When the $LM_{50}/LT_{50}$ ratio is 2 or more, the dispersed phases are each stretched in the extrusion direction so that a stable antistatic network structure is formed. From this standpoint of view, the $LM_{50}/LT_{50}$ ratio is more preferably 3 or more. The upper limit of the $LM_{50}/LT_{50}$ ratio is generally 20, preferably 15, more preferably 10. It is further preferred that the dispersed phases are also each stretched in the transverse direction.

It is further preferred that, on the above-mentioned vertical cross-section of the antistatic layer, the number-based median value $LT_{50}$ of diameters in the thickness direction of the dispersed phases is 10 to 600 nm, more preferably 15 to 500 nm, still more preferably 20 to 300 nm, particularly preferably 30 to 200 nm, for reasons of obtaining of a laminated foam sheet having excellent antistatic properties in a stable manner.

For the determination of each of the above-described area median value $S_{50}$ and diameter ratio $LM_{50}/LT_{50}$ in the antistatic layer of the laminated foam sheet, the laminated foam sheet is cut in a vertical direction along the extrusion direction thereof to obtain a test piece, in the form of a thin film, having a vertical cross-section of the laminated foam sheet. The thin film is then stained and measured by a transmission electron microscope to obtain a cross-sectional image. On the obtained image, the morphology of the dispersion phases is measured. The method for measuring the morphology will be hereinafter described in more detail below in Examples of the invention.

The laminated foam sheet according to the present invention preferably has the following physical properties. The antistatic layer provided on one side or each of both sides of the of the laminated foam sheet preferably has a surface resistivity of $1 \times 10^{13} \Omega$, or less, more preferably less than $5 \times 10^{12} \Omega$, still more preferably $1 \times 10^{12} \Omega$, or less, particularly preferably $5 \times 10^{11} \Omega$ or less, for reasons that the laminated foam sheet shows excellent antistatic properties and dust accumulation preventing effect. One or both sides of the antistatic layers may be further overlaid with a surface layer that is substantially free of a polymeric antistatic agent as long as the resulting laminated foam sheet has a surface resistivity of $1 \times 10^{13} \Omega$ or less.

The surface resistivity of the antistatic layer is measured according to JIS K6271(2001). More specifically, a test piece (having, for example, a length of 100 mm, a width of 100 mm and a thickness equal to that of the laminated foam sheet to be measured) is cut out from the laminated foam sheet. Then the test piece is impressed with a voltage of 500 V and measured for the surface resistivity [$\Omega$] of the antistatic layer 1 minute after the commencement of the voltage impression. Incidentally, the surface resistivity of the ionomer resin is measured in the same manner as above. In this case, however, the ionomer resin is heat-pressed at a temperature of 200° C. to form a sheet having a thickness of about 0.1 mm. From the obtained sheet, a test piece is cut out and measured for the surface resistivity of the ionomer resin.

The laminated foam sheet preferably has an apparent density of 15 to 200 kg/m$^3$, more preferably 20 to 150 kg/m$^3$, still more preferably 25 to 120 kg/m$^3$, for reasons of good balance between its lightness in weight, handleability and cushioning property. From the same reasons, the basis weight of the laminated sheet is preferably 10 to 200 g/m$^2$, more preferably 15 to 100 g/m$^2$, still more preferably 20 to 80 g/m$^2$.

The basis weight of the laminated foam sheet is measured as follows. A laminated foam sheet is vertically cut in the transverse direction to obtain a test piece having a width of, for example, 100 mm and a length equal to the transverse length of the laminated foam sheet. The test piece is measured for its weight [g]. The measured weight is divided by its area [m$^2$] to obtain the basis weight [g/m$^2$] of the test piece. The apparent density [kg/m$^3$] of the laminated foam sheet is determined by dividing the basis weight [kg/m$^2$] thereof by the thickness [m] of the test piece (with appropriate unit conversion).

The thickness (total thickness) of the laminated foam sheet is preferably 0.05 to 2 mm in order to improve the carrying efficiency in transportation of articles between which the laminated foam sheets are interposed. From this point of view, the upper limit of the thickness is more preferably 1.5 mm, still more preferably 1.2 mm, particularly preferably 1.0 mm. The lower limit of the thickness of the laminated foam sheet is preferably 0.1 mm, still more preferably 0.2 mm, particularly preferably 0.3 mm, for ensuring desired cushioning property thereof. The laminated foam sheet preferably has two antistatic layers provided on both sides of the foam layer, especially when used as an interleaf sheet that is to be interposed between articles such as glass plates.

It is also preferred that the antistatic layer (or each of the two antistatic layers when two antistatic layers are laminated on both sides of the foam layer) has a basis weight Bw of 20 g/m$^2$ or less, more preferably 15 g/m$^2$ or less, still more preferably 10 g/m² or less, particularly preferably 5 g/m² or less, from the standpoint of costs, lightness in weight as well as maintenance of desired antistatic properties. The lower limit of the basis weight Bw is generally 1 g/m², for reasons of improved efficiency for forming the antistatic layer.

The basis weight [g/m²] of the antistatic layer is determined on the basis of the extrusion rate thereof. More specifically, the basis weight Bw [g/m²] of the antistatic layer may be calculated by the following formula:

$$Bw=[(1000X)/(L \times W)]$$

wherein X represents an extrusion rate [kg/h] of the antistatic layer, L represents a drawing rate [m/h] of the laminated foam sheet and W represents the width (transverse length) [m] of the laminated foam sheet. Further, when the basis weight of the laminated foam sheet and the ratio of the extrusion rate of the antistatic layer relative to the extrusion rate of the foam layer are known, the basis weight of the antistatic layer may be determined by simple calculation.

Description will be next made of a process for producing a laminated foam sheet according to the present invention. The inventive process includes a step of providing a first melt containing a polyethylene-based resin (PE-1) and a physical blowing agent, and a step of providing a second melt containing a polyethylene-based resin (PE-2), an ionomer resin (which serves as a polymeric antistatic agent), a polyalkylene glycol and a volatile plasticizer. The first and second melts are then coextruded to form the laminated foam sheet in which the first melt forms a foam layer of the polyethylene-based resin (PE-1) and the second melt forms an antistatic layer that contains the polyethylene-based resin (PE-2) and is provided on at least one side of the foam layer.

More particularly, the polyethylene-based resin PE-1 is fed to an extruder and heated and kneaded, into which a physical blowing agent is injected. The resulting mixture is further kneaded to obtain the first melt for forming the foam layer. At the same time, the polyethylene-based resin PE-2 and the ionomer resin polymeric antistatic agent are fed to another extruder and heated and kneaded, to which the volatile plasticizer and the alkylene glycol are injected. The resulting mixture is further kneaded to obtain the second melt for forming the antistatic layer. The thus obtained first and second melts are fed to a coextrusion die and coextruded therethrough into a lower pressure environment (generally into the atmosphere) and allowed to expand. It is without saying that when the antistatic layer is laminated on both sides of the foam layer and when the two antistatic layers respectively differ in composition from each other, it is necessary to use melts with different compositions for forming the different antistatic layers.

The coextrusion foaming process is advantageous in that the production efficiency of the laminated foam sheet is high because formation of the foam layer and lamination of the antistatic layer on the foam layer can be carried out using a coextrusion die and in that a high interlayer adhesion strength between these layers is obtainable. The coextrusion foaming process includes two different methods. One method uses a flat coextrusion die through which a sheet like laminate is extruded and foamed to obtain the intended laminated foam sheet. Another method uses a circular die through which a tubular laminate is extruded and foamed. The tubular extruded laminate is drawn and enlarged over a mandrel and cut open to obtain the intended laminated foam sheet. Of these methods, the method using a circular die is preferred for reasons of easiness in producing a wide laminated foam sheet having a width (transverse length) of 1,000 mm or more.

In one preferred method for producing the laminated foam sheet by a coextrusion foaming process using a circular die, a polyethylene-based resin (PE-1) and, if necessary, one or more additives such as a cell controlling agent are fed to a first extruder and heated and kneaded, into which a physical blowing agent is injected. The resulting mixture is further kneaded to obtain a first melt for forming a foam layer. At the same time, a polyethylene-based resin (PE-2), an ionomer resin as a polymeric antistatic agent and, if necessary, one or more additives are fed to a second extruder and heated and kneaded, into which a volatile plasticizer and an alkylene glycol are injected. The resulting mixture is further kneaded to obtain a second melt for forming an antistatic layer. The first and second melts thus obtained are fed to a circular coextrusion die and combined. The combined stream is then coextruded through the die into the atmosphere and allowed to foam and expand. The tubular extruded laminate is then drawn and enlarged over a mandrel and cut open to obtain the intended laminated foam sheet.

It is preferred that the polyethylene-based resin (PE-1) has a melt flow rate (MFR) of 0.5 g/10 min to 15 g/10 min, more preferably 1 g/10 min to 12 g/10 min, from the standpoint of obtaining the desired apparent density of the foam layer. As used herein MFR is as measured according to JIS K7210-1(2014) at a temperature of 190° C. and a load of 2.16 kg.

It is also preferred that the polyethylene-based resin (PE-1) has a melting point (Tmp1) of 100 to 135° C., more preferably 100 to 130° C., still more preferably 100 to 120° C., particularly preferably 100 to 115° C., for reasons of good extrusion foaming property and capability of forming a foam layer with excellent cushioning property.

The melting point (Tmp1) is as measured by heat flux differential scanning calorimeter measurement according to JIS K7121 (1987). More specifically, the melting point is measured with a heating rate of 10° C./min after the test piece has been subjected to a conditioning treatment according to "3. Conditioning of Test Samples (2)" (cooling rate is 10° C./min) of JIS K7121 (1987). The peak top temperature of the measured fusion peak is the melting point (Tmp1). When there are two or more fusion peaks in the DSC curve, the peak top temperature of the fusion peak that has the largest area is the melting point (Tmp1).

The physical blowing agent that is incorporated into the first melt for forming the foam layer may be organic or inorganic physical blowing agent. As the organic physical foaming agent, there may be mentioned, for example, aliphatic hydrocarbons such as propane, n-butane, isobutane, n-pentane, isopentane, n-hexane and isohexane; alicyclic hydrocarbons such as cyclopentane and cyclohexane; chlorinated hydrocarbons such as methyl chloride and ethyl chloride; fluorinated hydrocarbons such as 1,1,1,2-tetrafluoroethane and 1,1-difluoroethane. As the inorganic physical foaming agent, there may be mentioned, for example, nitrogen, carbon dioxide, air and water. These physical blowing agents may be used as a mixture of two or more thereof. If desired, a decomposition type blowing agent such as azodicarbonamide may be used. Above all, organic physical blowing agents, particularly those which contain as their major ingredient n-butane, isobutane or a mixture thereof, are preferred for reasons of their compatibility with the polyethylene-based resin (PE-1) and foamability. When n-butane and isobutane are used as a mixture, the mixing ratio is not specifically limited. However, the mixing ratio of n-butane to isobutane is preferably 50:50 to 90:10, more preferably 60:40 to 80:20.

The addition amount of the blowing agent is controlled in view of the kind of the blowing agent and the intended apparent density of the laminated foam sheet. When butane or mixed butane is used as a physical blowing agent, for example, the addition amount thereof is preferably 3 to 30 parts by weight, more preferably 4 to 20 parts by weight, more preferably 6 to 18 parts by weight, based on 100 parts by weight of the polyethylene-based resin (PE-1).

The first melt for forming the foam layer generally contains a cell controlling agent. As the cell controlling agent, there may be used an inorganic or organic material. Examples of the inorganic cell controlling agent include metal salts of boric acid (such as zinc borate, magnesium borate and borax), sodium chloride, aluminum hydroxide, talc, zeolite, silica, calcium carbonate and sodium bicarbonate. Examples of the organic cell controlling agent include sodium 2,2-methylene-bis(4,6-di-t-butylphenyl)phosphate, sodium benzoate, calcium benzoate, aluminum benzoate and sodium stearate. Also usable as the cell controlling agent is of a sodium bicarbonate-citric acid-type that uses, for example, a combination of sodium bicarbonate with citric acid or a combination of sodium bicarbonate with an alkali metal salt of citric acid. These cell controlling agents may be used singly or in combination of two or more thereof. The addition amount of the cell controlling agent is adjusted in view of the intended cell diameters.

The polyethylene-based resin (PE-2) preferably has a melt flow rate MFR of 1 g/10 min to 20 g/10 min, more preferably 2 g/10 min to 15 g/10 min, at a temperature of 190° C. and a load of 2.16 kg, for reasons that the antistatic layer may be formed by the coextrusion lamination method in a stable manner. It is preferred that the melt flow rate MFR of the polyethylene-based resin (PE-2) is the same as or greater than that of the polyethylene-based resin (PE-1) of the foam layer.

The polyethylene-based resin (PE-2) preferably has a melt viscosity (at a temperature of 190° C. and a shear rate of 100 $sec^{-1}$) of 200 to 2,000 Pa·s, more preferably 300 to 1,200 Pa·s, particularly preferably 400 to 1,000 Pa·s.

The melt viscosity of the polyethylene-based resin (PE-2) may be measured using a device such as Capirograph 1 D (manufactured by Toyo Seiki Selsaku-Sho, Ltd.). Concretely, in a cylinder having a cylinder diameter of 9.55 mm and a length of 350 mm is set an orifice having a nozzle diameter of 1.0 mm and a length of 10 mm. The cylinder and the orifice are set at a temperature of 190° C. A specimen in a required amount is charged into the cylinder and allowed to stand for 5 minutes and melt. The molten resin is then extruded in the form of a string through the orifice at a shear rate of 100 $sec^{-1}$. The viscosity of the molten resin at the time of the extrusion is measured as the melt viscosity. The above measuring method may be also adopted for measuring a melt viscosity of the ionomer resin.

The ionomer resin is preferably contained in the second melt in an amount of 5 to 50% by weight based on the total weight of the polyethylene-based resin (PE-2) and the ionomer resin for reasons that a laminated foam sheet obtained shows desired antistatic properties without causing problems of transference of low molecular weight matters. The use of ionomer resin in an excess amount may cause an increase of the production costs and a difficulty in obtaining flat laminated foam sheets. From this stand point, the lower limit of the amount of the ionomer resin is more preferably 6% by weight, still preferably 8% by weight, particularly preferably 10% by weight, while the upper limit thereof is more preferably 45% by weight, still more preferably 40% by weight, yet still more preferably 30% by weight.

The ionomer resin preferably has a melt flow rate MFR (at a temperature of 190° C. and a load of 2.16 kg) of 10 g/10 min or less, more preferably 7 g/10 min or less, still more preferably 3 g/10 min, for reasons that low molecular weight matters that may be contained in the ionomer resin show less tendency to transfer from the laminated foam sheet to an article to be contacted therewith. The lower limit of MFR of the ionomer resin is about 1 g/10 min.

The ionomer resin preferably has a melt viscosity (at a temperature of 190° C. and a shear rate of 100 $sec^{-1}$) of 300 to 2,000 Pa·s, more preferably 500 to 1,500 Pa·s, particularly preferably 600 to 1,200 Pa·s. It is further preferred that the melt viscosity ratio of the ionomer resin to the polyethylene-based resin (PE-2) is in the range of 0.5 to 5.0, more preferably 0.8 to 4.0, particularly preferably 1.0 to 3.0 for reasons that the ionomer resin can be evenly dispersed in the polyethylene based resin (PE-2) in the presence of the alkylene glycol and the volatile plasticizer and that the antistatic layer can exhibit excellent antistatic properties throughout the whole surfaces thereof.

It is also preferred that the polyethylene-based resin (PE-2) has a melting point (Tmp) of 100 to 120° C., more preferably 102 to 115° C., for reasons that a desired lamination is attained between the foam layer and the antistatic layer, the antistatic layer becomes homogeneous and the laminated foam sheet shows uniform antistatic properties throughout the whole surfaces.

It is preferred that a difference (Tmp−Tmi) between a melting point Tmp of the polyethylene-based resin (PE-2) and a melting point Tmi of the ionomer resin is 5 to 30° C., more preferably 8 to 28° C., still more preferably 10 to 25° C., from the standpoint of proper dispersion of the ionomer resin in the polyethylene-based resin (PE-2).

It is important that second melt should contain the polyalkylene glycol and the volatile plasticizer in addition to the polyethylene-based resin (PE-2) and ionomer resin as a polymeric antistatic agent in order to obtain a laminated foam sheet having excellent antistatic properties.

It has been difficult to obtain a laminated foam sheet having the desired antistatic properties in a stable manner by laminating an ionomer-containing polyethylene-based resin antistatic layer on a polyethylene resin foam layer by a coextrusion lamination method, as described previously. The reason for this is considered to be that, in the antistatic layer, the ionomer resin is not easily dispersed in the polyethylene-based resin. Namely, although extrusion of a melt containing the ionomer resin and polyethylene-based resin at a high temperature is able to disperse the ionomer resin in the polyethylene-based resin, the use of a high coextrusion temperature causes failure to maintain the desired cell structure of the foam layer. In contrast, because of the presence of the volatile plasticizer and alkylene glycol in the second melt for forming the ionomer-containing antistatic layer, the process of the present invention allows lamination of the foam layer and the antistatic layer in a stable manner. Although not wishing to be bound by the theory, it is inferred that the above effect is achieved by the following mechanism.

The ionomer resin is a polymer having a pseudo-crosslinked structure in which metal cations and carboxylic acid groups are ionically bound. The melt viscosity of such an ionomer resin is greatly influenced by temperature. At a high temperature, the melt viscosity of the molten ionomer resin decreases. When the temperature of the molten ionomer resin is lowered to a level where the formation of the foam layer by expansion and foaming occur in a desired state, the melt viscosity of the ionomer resin increases. In the coextrusion lamination of an ionomer resin-containing polyethylene resin layer and a foam layer, it is essential that the melt for forming the foam layer should be adjusted to a coextrusion temperature at which the foaming of the melt appropriately proceeds. It follows that the temperature of the ionomer resin-containing melt is lowered and the melt viscosity of the ionomer resin increases. As a consequence, the ionomer resin fails to be easily dispersed in the polyethylene resin matrix, thereby causing a difficulty to produce the laminated foam sheet having desired antistatic properties in a stable manner. This becomes especially remarkable when the ionomer resin has a low melt flow rate.

In the process of the present invention, on the other hand, the second melt for forming the antistatic layer is added with the alkylene glycol, which has a high plasticizing effect for the ionomer resin. Therefore, even when the extrusion temperature of the second melt for forming the antistatic layer is made low so as to match with the extrusion temperature of the first melt for forming the foam layer, the melt viscosity of the ionomer resin can be maintained in a low level. The plasticizing effect is attainable even when the ionomer resin has a low melt flow rate. It is believed that, for the reasons as described above, the process of the present invention is able to form, in a stable manner, the laminated foam sheet having an antistatic layer which is laminated on at least one side of a foam layer and in which the ionomer resin is uniformly and finely dispersed in the polyethylene-based resin (PE-2) to give improved antistatic properties.

The alkylene glycol is preferably used in the second melt in such an amount as to provide a weight ratio of the polyalkylene glycol to the ionomer resin is 0.03 to 0.6, more preferably 0.03 to 0.5, still more preferably 0.04 to 0.4, particularly preferably 0.05 to 0.3, for reasons that the ionomer resin is efficiently dispersed in the matrix of the polyethylene-based resin (PE-2) and that the second melt shows desired film forming property.

It is preferred that the ionomer resin has a melting point Tmi of about 80 to 110° C., more preferably 85 to 100° C.

The melting points Tmp of the polyethylene-based resin (PE-2) and Tmi of the ionomer resin are as measured by heat flux differential scanning calorimeter measurement according to JIS K7121 (1987) in the same manner as described previously in connection with the polyethylene-based resin (PE-1).

It is also important that a volatile plasticizer should be contained in the second melt for forming the antistatic layer. Examples of the volatile plasticizer include saturated hydrocarbons having 3 to 5 carbon atoms, dialkyl ethers in which each alkyl has 1 to 3 carbon atoms and alcohols. Among these volatile plasticizers, saturated hydrocarbons having 3 to 5 carbon atoms and dialkyl ethers in which each alkyl has 1 to 3 carbon atoms are particularly preferred for reasons of their high plasticizing effect for the polyethylene-based resin (PE-2) and of their ability to stably maintain the melt viscosity of the polyethylene-based resin (PE-2). Thus, even when the extrusion temperature of the second melt for forming the antistatic layer is made low so as to match with the extrusion temperature (generally 100 to 140° C.) of the first melt for forming the foam layer, the melt viscosity of the second melt as a whole can be maintained in a low level. It is believed that for this reason the obtained antistatic layer has a uniform thickness and a desirable morphology in which horizontally stretched dispersed phases of the ionomer resin are finely dispersed in the matrix of the polyethylene-based resin so that the laminated foam sheet having excellent antistatic properties are obtained in a stable manner.

Specific examples of the saturated hydrocarbons having 3 to 5 carbon atoms include propane, n-butane, isobutane, n-pentane and isopentane. The use of n-butane, isobutane or a mixture thereof is particularly preferred for reasons of its excellent plasticizing effect for the polyethylene-based resin (PE-2) and its capability of effectively reducing the melt viscosity of the polyethylene-based resin (PE-2) during the coextrusion lamination process. When n-butane and isobutane are used as a mixture, the mixing ratio is not specifically limited. However, the mixing ratio of n-butane to isobutane is preferably 50:50 to 90:10, more preferably 60:40 to 80:20.

Examples of dialkyl ethers in which each alkyl has 1 to 3 carbon atoms include dimethyl ether, diethyl ether, dipropyl ether and methyl ethyl ether. Dimethyl ether is particularly preferred for reasons of its excellent plasticizing effect for the polyethylene-based resin (PE-2) and its capability of effectively reducing the melt viscosity of the polyethylene-based resin (PE-2) during the coextrusion lamination process.

The alcohols used as the volatile plasticizer preferably have a boiling point of 120° C. or less because such an alcohol is capable of dispersing the ionomer resin in the polyethylene-based resin PE-2 and of facilitating stretching the ionomer resin. Examples of the alcohol include methanol, ethanol, 1-propanol, 2-propanol, 1-butanol, 2-methyl-1-propanol, 2-butanol and 2-methyl-2-propanol. These alcohols may be used singly or a mixture of two or more thereof. Above all, ethanol or a mixture of ethanol and one or more other alcohols is preferred because of its capability of significantly lowering the melt viscosity of the ionomer resin and its easiness in handling during the fabrication of the laminated foam sheet. It is thus preferred that the ethanol mixture contains ethanol in an amount of 50% by weight or more, more preferably 60% by weight or more, still more preferably 70% by weight or more, particularly preferably 80% by weight or more, based on the weight of the ethanol mixture.

It is preferred that the volatile plasticizer is present in the second melt in an amount of 0.1 to 10 mols, more preferably 0.5 to 9 mols, still more preferably 1 to 8 mols, particularly preferably 2 to 7 mols, per kg of the total weight of the polyethylene-based resin (PE-2) and the ionomer resin for reasons that a uniform antistatic layer can be formed and a good lamination state between the foam layer and antistatic layer can be obtained. For the same reasons, the volatile plasticizer is used in an amount of 1 to 60 parts by weight, more preferably 5 to 50 parts by weight, particularly preferably 10 to 40 parts by weight, per 100 parts by weight of the total of the polyethylene-based resin (PE-2) and the ionomer resin.

It is also preferred that the weight ratio of the volatile plasticizer to the polyalkylene glycol in the second melt is 5 to 100, more preferably 6 to 90, particularly preferably 10 to 60, from the standpoint of formation of the antistatic layer which has excellent antistatic properties and in which the ionomer resin is appropriately dispersed in the polyethylene-based resin (PE-2).

The second melt for forming the antistatic layer preferably contains a filler such as inorganic powder. The amount, kind and effect of the filler are as described previously.

The laminated foam sheet of the present invention may be advantageously used as, for example, interleaf sheets for protecting plate materials. The laminated foam sheet is particularly useful as an interleaf sheet for being interposed between glass substrates that are employed as glass panels for various image display devices such as liquid crystal display, plasma display and electroluminescence display.

The present invention will be further described by way of examples and comparative examples. The polyethylene-based resins, ionomer resin polymeric antistatic agent, polyalkylene glycol, blowing agent, volatile plasticizer and cell controlling agent used in Examples 1 to 3 and Comparative Examples 1 to 3 were as given below.
(1) Polyethylene-Based Resin:
PE-1 and PE-2: Low-density polyethylene (Tradename "NUC8321" manufactured by NUC Corporation), Density: 922 kg/m$^3$, MFR: 2.4 g/10 min, Melt viscosity: 818 Pa·s, Melting point: 111° C.;
(2) Ionomer Resin (Polymeric Antistatic Agent):
SD100: Potassium ionomer resin (Tradename "ENTIRA SD100" manufactured by duPont-Mitsui Polychemicals Co., Ltd.), Density: 990 kg/m$^3$, MFR: 5 g/10 min, Melt viscosity: 823 Pa·s, Melting point: 92° C.;
MK400: Potassium ionomer resin (Tradename "ENTIRA MK400" manufactured by duPont-Mitsui Polychemicals Co., Ltd.), Density: 970 kg/m$^3$, MFR: 1.5 g/10 min, Melt viscosity: 1,879 Pa·s, Melting point: 93° C.;
(3) Polyalkylene Glycol:
PEG: Polyethylene glycol (Tradename "PEG300" manufactured by Sanyo Chemical Industries, Ltd.), Number average molecular weight: 300
(4) Physical Blowing Agent:
Mixed butane: Mixture composed of 65 wt % of n-butane and 35 wt % of isobutane;
(5) Volatile Plasticizer:
Mixed butane: Mixture composed of 65 wt % of n-butane and 35 wt % of isobutane;
(6) Cell Controlling Agent:
Talc (HI-FILLER #12 manufactured by Matsumura Sangyo Co., Ltd.).

The apparatus used for forming three-layered laminated foam sheets in Examples 1 to 3 and Comparative Examples 1 to 3 was as follows. For forming a foam layer, a first extruder with an inside diameter of 115 mm was used. For forming each of the two antistatic layers, a second extruder with an inside diameter of 65 mm was used. The first and second extruders were connected at their outlets to a coextrusion circular die for forming the laminated foam sheet. The circular die was provided with separate tubular passageways constructed such that a melt for forming the antistatic layers was combined with and laminated on inner and outer sides of a tubular stream of a melt for forming a foam layer. The coextrusion circular die had an outlet diameter of 110 mm.

Example 1

A three-layered laminated foam sheet having a foam layer and two antistatic layers provided on both sides of the foam layer was prepared.

To the first extruder were fed 100 parts by weight of the polyethylene-based resin PE-1 and 2 parts by weight of the cell controlling agent. The feeds were melted and kneaded at about 200° C. in the first extruder, to which the physical blowing agent was injected in an amount of 12 parts by weight per 100 parts by weight of the polyethylene-based resin PE-1 and kneaded together. The kneaded mass was adjusted at a resin temperature of about 112° C. to obtain a first melt for forming a foam layer.

At the same time, the polyethylene-based resin PE-2 (same as PE-1) and the ionomer resin shown in Table 1 (SD100) were supplied to the second extruder in the amounts shown in Table 1 and, then, melted and kneaded at a temperature of about 200° C. Thereafter, the volatile plasticizer (mixed butane) and the polyalkylene glycol (PEG300) were injected into the kneaded mass in the second extruder and kneaded together and then adjusted to a resin temperature of about 120° C. to obtain a second melt for forming an antistatic layer. The addition amount of PEG300 was as shown in Table 1, where the amount thereof is expressed in terms of parts by weight per 100 parts by weight of the total of PE-2 and the ionomer resin; % by weight based on the total of PE-2, the ionomer resin and PEG300; and weight ratio of PEG300 to the ionomer resin. The addition amount of the mixed butane was as shown in Table 1, where the amount thereof is expressed in terms of mols per kg of the total of PE-2 and the ionomer resin; and parts by weight per 100 parts by weight of the total of PE-2 and the ionomer resin. The weight ratio of the mixed butane to PEG300 is also shown in Table 1. In Table 1, all parts and percentages are by weight unless otherwise indicated.

Into the coextrusion circular die, the thus prepared first and second melts were fed from respective extruders at a discharge rate (extrusion rate) of 150 kg/hour in the case of the first melt for forming the foam layer and at 10 kg/hour in the case of the second melt for forming each of the antistatic layers. The feeds in the circular die were combined such that two tubular streams of the melt for forming the antistatic layers were laminated respectively on inner and outer sides of the tubular stream of the melt for forming the foam layer. The combined streams were then coextruded and discharged through the coextrusion die into the atmosphere to obtain a tubular laminate foam product having two antistatic layers (S side antistatic layer and M side antistatic layer) provided on both sides of the foam layer. The "M side" is that side of the laminated foam sheet which faced the mandrel during the fabrication thereof, while "S side" is the opposite side of the M side.

The tubular laminate foam product was drawn, while being enlarged over a mandrel with an outer diameter of 450 mm, and cut open in the extrusion direction to obtain the laminated foam sheet having a width of about 1.3 m. The draw rate of the tubular laminate was adjusted so that the basis weight of the laminated foam sheet was as shown in Table 2.

Example 2

Example 1 was repeated in the same manner as described above except that the amount of the polyalkylene glycol (PEG300) was changed as shown in Table 1 to obtain a laminated foam sheet.

Example 3

Example 1 was repeated in the same manner as described above except that the kind and amount of the ionomer resin and the amount of the polyalkylene glycol (PEG300) were changed as shown in Table 1 to obtain a laminated foam sheet.

Comparative Examples 1 to 3

Example 1 was repeated in the same manner as described above except that the amount of the polyalkylene glycol (PEG300) was changed as shown in Table 1 to obtain laminated foam sheets.

The laminated foam sheets obtained in Examples 1 to 3 and Comparative Examples 1 and 2 were measured for their physical properties (thickness, basis weight and apparent density and the basis weight of the antistatic layer (one antistatic layer) thereof) according to the methods described previously to give the results shown in Table 2. Further, the morphology of the antistatic layer of each of the laminated foam sheets was analyzed to give the results shown in Table 2. Also measured were antistatic properties and transference preventing properties (properties to prevent low molecular weight matters from transferring from the laminated foam sheets) of the laminated foam sheets to give the results shown in Table 3. Because the laminated foam sheet obtained in Comparative Example 3 was poor in lamination state of the antistatic layers, the physical properties, morphology, antistatic properties and transference preventing properties thereof were not measured. The morphology, antistatic properties and transference preventing properties were measured by the methods described hereinafter.

TABLE 1

| | Polyalkylene glycol (PEG300) | | | | | | Volatile plasticizer | | | |
|---|---|---|---|---|---|---|---|---|---|---|
| | PE-2 | Ionomer resin | | | Amount per 100 parts of PE-2 plus ionomer resin | Amount per total weight of PE-2, ionomer resin and PEG300 | Weight ratio of PEG300 to ionomer resin | | Amount per kg of PE-2 plus ionomer resin | Amount per 100 parts of PE-2 plus ionomer resin | Weight ratio of mixed butane to PEG300 |
| | Amount (%) | Kind | Amount (%) | Kind | (parts) | (%) | | Kind | (mol/kg) | (parts) | |
| Example 1 | 90 | SD100 | 10 | PEG300 | 1.0 | 1.0 | 0.10 | Mixed butane | 4.3 | 25 | 25 |
| Example 2 | 90 | SD100 | 10 | PEG300 | 0.3 | 0.3 | 0.03 | Mixed butane | 4.3 | 25 | 83 |
| Example 3 | 85 | MK400 | 15 | PEG300 | 4.0 | 3.8 | 0.27 | Mixed butane | 4.3 | 25 | 6.3 |
| Comparative Example 1 | 90 | SD100 | 10 | — | — | — | — | Mixed butane | 4.3 | 25 | — |
| Comparative Example 2 | 90 | SD100 | 10 | PEG300 | 0.2 | 0.2 | 0.02 | Mixed butane | 4.3 | 25 | 125 |
| Comparative Example 3 | 90 | SD100 | 10 | PEG300 | 8.0 | 7.4 | 0.80 | Mixed butane | 4.3 | 25 | 3.1 |

TABLE 2

| | Physical Properties of Laminated Foam Sheet | | | | Morphology of Antistatic Layer (S side) | | | |
|---|---|---|---|---|---|---|---|---|
| | Whole Sheet | | | Antistatic Layer | | | | |
| | Thickness mm | Basis Weight g/m$^2$ | Apparent Density kg/m$^3$ | Basis Weight g/m$^2$ | $S_{50}$ nm$^2$ | $LT_{50}$ nm | $LM_{50}$ nm | $LM_{50}/LT_{50}$ |
| Example 1 | 1 | 29 | 29 | 1.7 | $2.7 \times 10^4$ | 88 | 823 | 9.4 |
| Example 2 | 1 | 29 | 29 | 1.7 | $2.6 \times 10^4$ | 88 | 402 | 4.6 |
| Example 3 | 1 | 29 | 29 | 1.7 | $2.9 \times 10^4$ | 112 | 355 | 3.2 |
| Comparative Example 1 | 1 | 29 | 29 | 1.7 | $6.9 \times 10^6$ | 2330 | 4790 | 2.1 |
| Comparative Example 2 | 1 | 29 | 29 | 1.7 | $7.7 \times 10^5$ | 820 | 4340 | 5.3 |
| Comparative Example 3 | — | — | — | — | — | — | — | — |

TABLE 3

| | Antistatic Properties | | | Transference Preventing Property | |
|---|---|---|---|---|---|
| | Surface Resistivity | | | Haze | |
| | M side Ω | S side Ω | Evaluation | (H1 − H0) % | Evaluation |
| Example 1 | $9.7 \times 10^{10}$ | $4.9 \times 10^{10}$ | Good | 1.7 | Good |
| Example 2 | $1.7 \times 10^{11}$ | $8.1 \times 10^{10}$ | Good | 1.9 | Good |
| Example 3 | $2.7 \times 10^9$ | $2.4 \times 10^9$ | Good | 3.4 | Good |
| Comparative Example 1 | $>1.0 \times 10^{16}$ | $>1.0 \times 10^{16}$ | No good | 2.1 | Good |
| Comparative Example 2 | $>1.0 \times 10^{16}$ | $>1.0 \times 10^{16}$ | No good | 2.0 | Good |

TABLE 3-continued

| | Antistatic Properties | | | Transference Preventing Property | |
|---|---|---|---|---|---|
| | Surface Resistivity | | | Haze | |
| | M side Ω | S side Ω | Evaluation | (H1 − H0) % | Evaluation |
| Comparative Example 3 | — | — | — | — | — |

Figure 1:
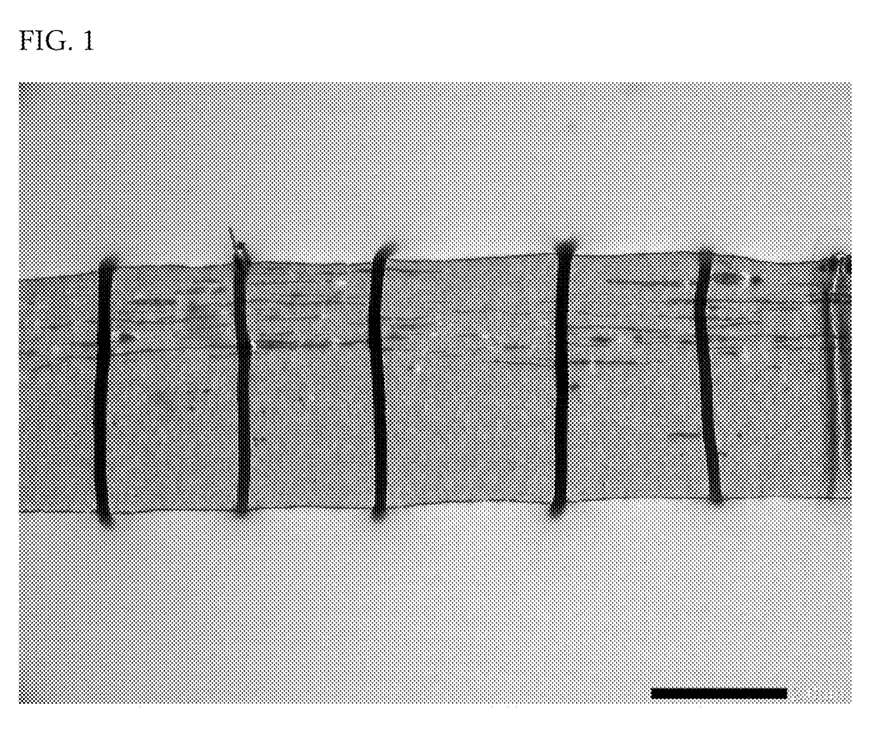
FIG. 1 is a transmission electron photomicrograph (at magnification of 17,500) of a vertical cross-section of an antistatic layer taken along the extrusion direction of an extruded laminated foam sheet obtained in Example 1.
Figure 2:
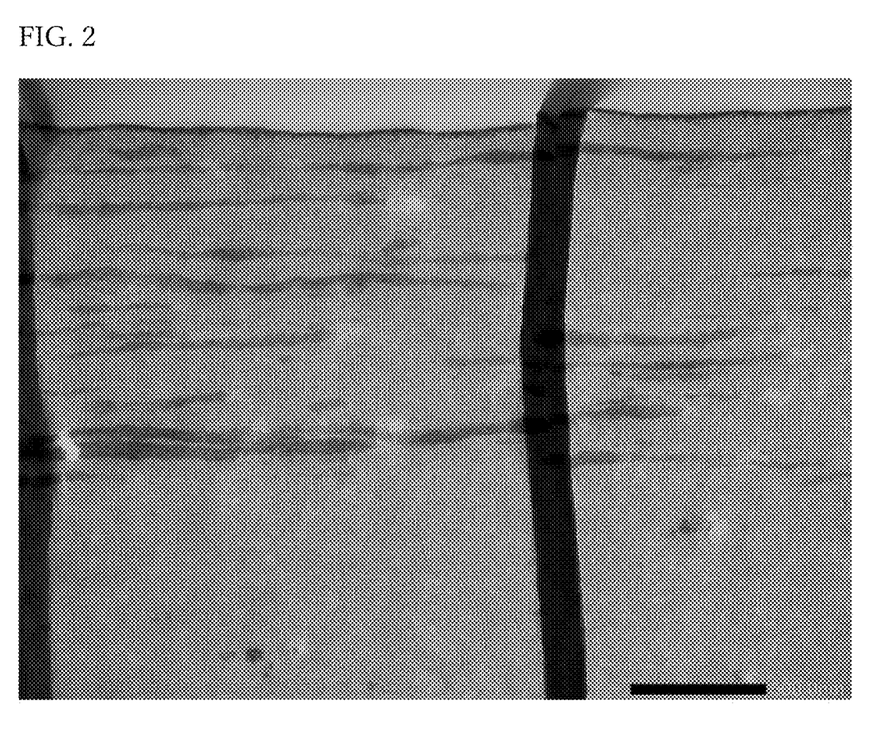
FIG. 2 is a transmission electron photomicrograph (at magnification of 70,000) of a vertical cross-section of an antistatic layer taken along the extrusion direction of the extruded laminated foam sheet obtained in Example 1.
Figure 3:
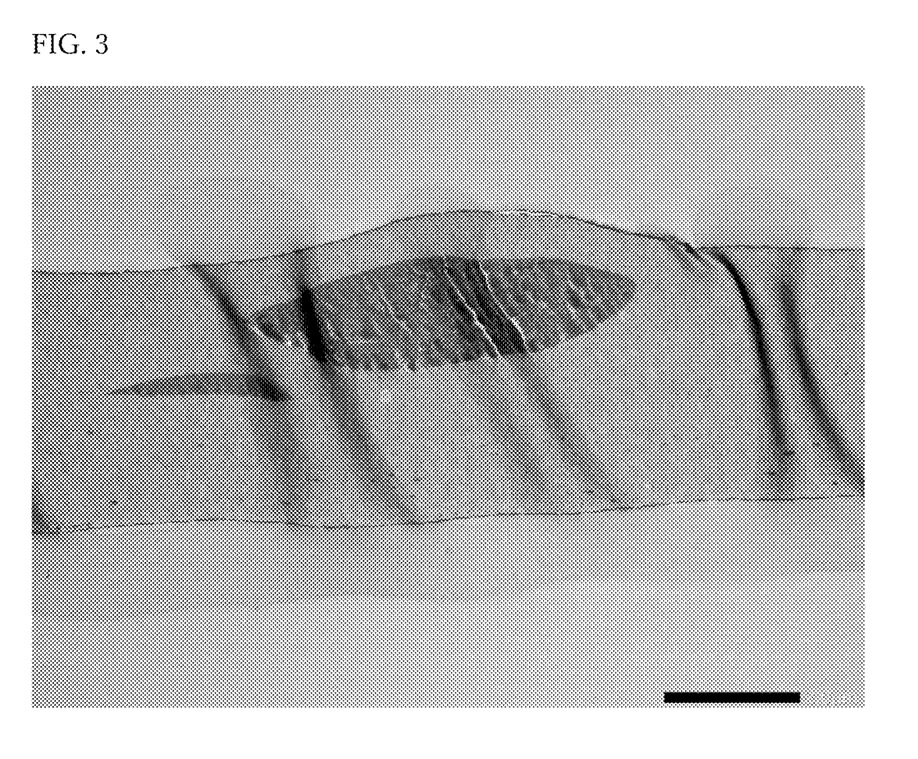
FIG. 3 is a transmission electron photomicrograph (at magnification of 17,500) of a vertical cross-section of an antistatic layer taken along the extrusion direction of an extruded laminated foam sheet obtained in Comparative Example 1.

Method of Measuring $S_{50}$, $LM_{50}$ and $LT_{50}$ in Table 2:

The laminated foam sheet was cut, at three locations including near the center and near both side ends in the traverse direction thereof, in the vertical direction along the extrusion direction thereof to obtain two vertical cross-sections of each of the three locations of the laminated foam sheet. A test piece in the form of an ultrathin film having a vertical cross-section of the antistatic layer (S side antistatic layer) was cut out from one of the two cross-sections of each of the three locations. The thus obtained three test pieces were each stained with ruthenium tetraoxide so that the polyethylene-based resin phase was able to be discriminated from the ionomer resin phase by light and dark tone. The stained cross-section of each test piece was observed and measured using a transmission electron microscope (JEM-1400Plus manufactured by JEOL Ltd.) at an acceleration voltage of 100 kV and at 17,500 and 70,000 fold magnification to obtain cross-sectional images in the above-described three locations of the antistatic layer. FIG. 1 and FIG. 2 are transmission electron photomicrographs at magnification of 17,500 and 70,000, respectively, of the antistatic layer of Example 1, and FIG. 3 shows a similar transmission electron photomicrograph at magnification of 17,500 of the antistatic layer of Comparative Example 1. In FIGS. 1 to 3, the dark parts and light parts show ionomer resin phases and polyethylene-based resin phases, respectively.

The cross-sectional photographs were each subjected to a pretreatment for the purpose of differentiate the dispersed phases from others (continuous phase) by black-white patterns on the basis of the contrast thereof and existence of a lamella structure. Since the ionomer resin has a higher amorphous content as compared with the polyethylene-based resin, the dispersed phases may be regarded as domains that lack lamellar structure as compared with the continuous phase in the cross-sectional photograph. The boundary portions between the continuous phase and dispersed phases were included in the dispersed phases. Then the pretreated cross-sectional photograph was analyzed with an image processing software (NonoHunter NS2K-Pro, manufactured by Nanosystem Co., Ltd.) under the following conditions:

(1) monochrome conversion
(2) smoothing filter (processing number time: 1 to 10)
(3) binarization by NS method (definition: 41, sensitivity: 10, noise removal, concentration range: 45 to 255)
(4) Feret's diameter and area measurement In the measurement under the above conditions (1) to (4), a measuring region was selected at random from the cross-section of the antistatic layer in such a way that the total area of the selected region was at least 100 μm².

The number-based median value $S_{50}$ of cross-sectional areas of the dispersed phases in the antistatic layer was measured as follows. The number and cross-sectional areas of all the dispersed phases in the selected region were measured. Those dispersed phases which intersected the boundary of the selected region were included in the measurement. Those dispersion phases which had a cross-sectional area of 1 nm² or less were excluded from the measurement. Black portions, such as wrinkles and/or outermost parts of the film, that were not attributed to the dispersed phases were excluded from the measurement, either. The measurement was carried out for each of the three test pieces. From the number of the dispersed phases and cross-sectional areas of the dispersed phases that were measured in the three test pieces, the number-based median value $S_{50}$ of cross-sectional areas of the dispersed phases in the antistatic layer was determined. The number-based median cross-sectional area $S_{50}$ is a cross-sectional area of the dispersed phase at 50% cumulative number of the dispersed phases arranged in the order of their sizes.

Method of Determining Aspect Ratio $LM_{50}/LT_{50}$ in Table 2:

The number-based median value $LM_{50}$ of diameters in the extrusion direction of the dispersed phases and the number-based median value $LT_{50}$ of diameters in the thickness direction of the dispersed phases were determined as follows. Under the above conditions (1) to (4), the dispersed phases on the cross-sectional photograph were measured for their Feret's diameters in both the extrusion and thickness directions. Those dispersed phases which intersected the boundary of the selected region were included in the measurement. The measurement was carried out for each of the above-described three test pieces. From the number of the dispersed phases and Feret's diameters in both the extrusion and thickness directions of the dispersed phases that were measured in the three test pieces, $LM_{50}$ and $LT_{50}$ were determined. The number-based median diameter $LM_{50}$ of the dispersed phases is the Feret's diameter in the extrusion direction of the dispersed phase at 50% cumulative number of the dispersed phases arranged in the order of their Feret's diameters, while the number-based median diameter $LT_{50}$ of the dispersed phases is the Feret's diameter in the thickness direction of the dispersed phase at 50% of the cumulative number.

Methods of Measuring Surface Resistivity and Transference Preventing Property in Table 2:

The surface resistivity of each of the antistatic layers provided on both sides of the foam layer was determined by the following method. Three test pieces, each having a length of 100 mm, a width of 100 mm and a thickness equal to that of the laminated foam sheet are cut out from the laminated foam sheet at randomly selected locations. Then, in accordance with the method of JIS K6271 (2001), each of the test pieces is placed in an environment with a temperature of 23° C. and a relative humidity of 50% and impressed with a voltage of 500 V. The surface resistivity of each test piece is measured 1 minute after the commencement of the voltage impression. The measurement is carried out on each of the both surfaces of each of the three test pieces. The surface resistivity of each side of the laminated foam sheet is an arithmetic mean of the three measured values. As the measurement instrument, Model TR8601 manufactured by Takeda Riken Industry Co., Ltd. is used.

The antistatic properties of the laminated foam sheets were evaluated on the basis of the following criteria.
Good: Surface resistivity of both S and M sides of the antistatic layer is $1 \times 10^{13} \Omega$ or less.
No good: Surface resistivity of at least one of the S and M sides of the antistatic layer exceeds $1 \times 10^{13} \Omega$.

The method of measuring transference preventing property is as follows. Preclean slide glass manufactured by Matsunami Glass Industries, Ltd. was used as a material to be in direct contact with the laminated foam sheet. Ten sheets of the slide glasses were stacked one over the other to obtain a stack of ten glass sheets. This stack was measured for its haze value (H0 [%]) in the thickness direction (stacking direction) of the laminate using a haze meter (Model NDH2000 manufactured by Nippon Denshoku Industries Co., Ltd.). Next, one side of each of ten sheets of the similar slide glasses was press-contacted with the laminated foam sheet at a pressure of 50 g/cm$^2$ and then allowed to quiescently stand as such in an environment maintained at a temperature of 60° C. and a relative humidity of 90% for 24 hours. Then, the laminated foam sheets were removed and the remaining ten sheets of the slide glass were stacked one over the other. The glass stack was measured for its haze value (H1 [%]) in the same manner as above. A difference (H1−H0) between the glass haze values before and after the contact with the laminated foam sheet was calculated. The smaller the difference (H1−H0), the lower is the transference of low molecular weight matters contained in the antistatic agent of the laminated foam sheet to the slide glass. The transference preventing property is rated as follows:

Good: the difference is 4% or less
No good: the difference exceeds 4%

What is claimed is:

1. An extruded laminated foam sheet comprising a foam layer containing a polyethylene-based resin (PE-1), and an antistatic layer laminated on at least one side of the foam layer,
    said antistatic layer having a basis weight of 1 to 20 g/m$^2$ and containing a polyethylene-based resin (PE-2), an ionomer resin having an antistatic property and a polyalkylene glycol,
    wherein the ionomer resin is contained in the antistatic layer in an amount of 5 to 50% by weight based on the total weight of the polyethylene-based resin (PE-2) and the ionomer resin,
    wherein the polyethylene-based resin (PE-2) forms a continuous phase, and the ionomer resin forms dispersed phases dispersed in the continuous phase, and
    wherein, on a vertical cross-section of the antistatic layer, which is taken along the extrusion direction of the laminated foam sheet, a number-based median value $S_{50}$ of cross-sectional areas of the dispersed phases is $1\times10^2$ to $5\times10^5$ nm$^2$, and
    wherein a weight ratio of the polyalkylene glycol to the ionomer resin is 0.03 to 0.6.

2. The extruded laminated foam sheet according to claim 1, wherein, on the vertical cross-section of the antistatic layer, an aspect ratio $LM_{50}/LT_{50}$ of a number-based median value $LM_{50}$ of diameters in the extrusion direction of the dispersed phases to a number-based median value $LT_{50}$ of diameters in the thickness direction of the dispersed phases is 2 or more.

3. The extruded laminated foam sheet according to claim 1, wherein the polyalkylene glycol is present in the antistatic layer in an amount of 0.3 to 6% based on the weight of the antistatic layer.

4. The extruded laminated foam sheet according to claim 1, wherein a difference (Tmp−Tmi) between a melting point Tmp of the polyethylene-based resin (PE-2) and a melting point Tmi of the ionomer resin is 5 to 30° C.

5. The extruded laminated foam sheet according to claim 1, wherein the antistatic layer has a surface resistivity of $1\times10^{13}\Omega$ or less.

6. The extruded laminated foam sheet according to claim 1, wherein the extruded laminated foam sheet has a thickness of 0.05 to 2 mm.

7. The extruded laminated foam sheet according to claim 1, wherein the extruded laminated foam sheet has an apparent density of 15 to 200 kg/m$^3$.

8. A process for producing a laminated foam sheet having a polyethylene-based resin foam layer and a polyethylene-based resin antistatic layer laminated on at least one side of the foam layer, comprising the steps of:
    providing a first melt containing a polyethylene-based resin (PE-1) and a physical blowing agent,
    providing a second melt containing a polyethylene-based resin (PE-2), an ionomer resin having an antistatic property, a polyalkylene glycol and a volatile plasticizer, and
    coextruding the first and second melts to form the laminated foam sheet in which the polyethylene-based resin foam layer and the polyethylene-based resin antistatic layer are formed from the first and second melts, respectively,
    wherein the ionomer resin is present in the second melt in an amount of 5 to 50% by weight based on the total weight of the polyethylene-based resin (PE-2) and the ionomer resin, wherein a weight ratio of the polyalkylene glycol to the ionomer resin is 0.03 to 0.6,
    wherein the antistatic layer having a basis weight of 1 to 20 g/m$^2$,
    wherein the polyethylene-based resin (PE-2) forms a continuous phase, and the ionomer resin forms dispersed phases dispersed in the continuous phase, and
    wherein, on a vertical cross-section of the antistatic layer, which is taken along the extrusion direction of the laminated foam sheet, a number-based median value $S_{50}$ of cross-sectional areas of the dispersed phases is $1\times10^2$ to $5\times10^5$ nm$^2$.

9. The process according to claim 8, wherein the volatile plasticizer is present in the second melt in an amount of 1 to 60 parts by weight per 100 parts by weight of the total weight of the polyethylene-based resin (PE-2) and the ionomer resin and wherein a weight ratio of the volatile plasticizer to polyalkylene glycol is 5 to 100.

10. The process according to claim 8, wherein the volatile plasticizer is at least one selected from the group consisting of saturated hydrocarbons having 3 to 5 carbon atoms, dialkyl ethers in which each alkyl has 1 to 3 carbon atoms, and alcohols.

11. The process according to claim 8, wherein the volatile plasticizer is n-butane, isobutane or a mixture thereof.

* * * * *